(12) United States Patent
Nakamura (10) Patent No.: US 11,660,991 B2
(45) Date of Patent: May 30, 2023

(54) VEHICLE SEAT

(71) Applicant: TACHI-S CO., LTD., Akishima (JP)

(72) Inventor: Mitsuhisa Nakamura, Akishima (JP)

(73) Assignee: TACHI-S CO., LTD., Tokyo (JP)

(*) Notice: Subject to any disclaimer, the term of this patent is extended or adjusted under 35 U.S.C. 154(b) by 0 days.

(21) Appl. No.: 17/471,319

(22) Filed: Sep. 10, 2021

(65) Prior Publication Data

US 2022/0203878 A1 Jun. 30, 2022

(30) Foreign Application Priority Data

Dec. 28, 2020 (JP) .............................. JP2020-218951

(51) Int. Cl.
| | |
|---|---|
| *B60N 2/80* | (2018.01) |
| *B60N 2/879* | (2018.01) |
| *B60R 11/02* | (2006.01) |
| *B60R 16/02* | (2006.01) |
| *B60N 2/897* | (2018.01) |
| *B60N 2/68* | (2006.01) |

(52) U.S. Cl.
CPC ............. *B60N 2/879* (2018.02); *B60N 2/682* (2013.01); *B60N 2/897* (2018.02); *B60R 11/0217* (2013.01); *B60R 16/0215* (2013.01)

(58) Field of Classification Search
CPC ........ B60N 2/879; B60N 2/897; B60N 2/682; B60R 11/0217; B60R 16/0215
USPC ........................................................ 297/391
See application file for complete search history.

(56) References Cited

U.S. PATENT DOCUMENTS

| 11,336,976 | B2* | 5/2022 | Subat ..................... H04R 1/023 |
| 2017/0106775 | A1* | 4/2017 | Takada ................. H04R 1/2819 |
| 2018/0035185 | A1* | 2/2018 | Fujita ....................... A47C 7/38 |
| 2019/0184880 | A1* | 6/2019 | Kakishima ............. B60N 2/879 |

(Continued)

FOREIGN PATENT DOCUMENTS

| JP | 2003-299549 A | 10/2003 |
| JP | 4338028 B2 | 9/2009 |
| JP | 4730255 B2 | 7/2011 |

(Continued)

OTHER PUBLICATIONS

Office Action dated Mar. 1, 2022, in Chinese Patent Application No. 202122940630.5.

*Primary Examiner* — Mark R Wendell
(74) *Attorney, Agent, or Firm* — Potomac Law Group, PLLC (57) ABSTRACT

A vehicle seat with a speaker-equipped headrest is provided, which is of a relatively simple structure to enable the speaker-equipped headrest to be easily mounted to/dismounted from a seat body after vehicle installation, and also provide increased versatility for installation in vehicles of various vehicle size classes. The vehicle seat with the speaker-equipped headrest includes: a male coupler that is connected to a speaker harness and fitted to a distal end of a headrest stay; and a female coupler that is connected to a main harness on a seat body side, and fitted to a headrest guide bracket supporting a headrest guide. Insertion of the headrest stay into the headrest guide allows the speaker-equipped headrest to be mounted to the seat body, and allows the male coupler and the female coupler to be fitted together to provide a connection between the speaker harness and the main harness.

6 Claims, 6 Drawing Sheets

(56) References Cited

U.S. PATENT DOCUMENTS

2019/0184881 A1   6/2019  Kakishima et al.

FOREIGN PATENT DOCUMENTS

| JP | 4976182 B2 | 7/2012 |
| JP | 5343587 B2 | 11/2013 |
| JP | 2019-108118 A | 7/2019 |

* cited by examiner

VEHICLE SEAT

CLAIM OF PRIORITY

The present application claims priority from Japanese Patent application serial No. 2020-218951, filed on Dec. 28, 2020, the content of which is hereby incorporated by reference into this application.

BACKGROUND OF THE INVENTION

The present invention relates to a structure of a vehicle seat and, more particularly, to a useful technique for application to a structure for mounting a speaker-equipped headrest.

A car speaker equipped on vehicle is often installed in a forward lower portion of a front door or a rear door, so that music is heard from a listener's feet to lower the position of a sound image. The sound quality of the speaker depends on a "mounting position" of the speaker, and the primary condition for comfortable sound is typically that sound comes from front of the listener.

To address this, speakers built in headrests have been increasingly developed through the years. The speakers built in the headrests have been initially developed specifically for luxury vehicles, and at the present day, the application to compact vehicles is studied. Sound used to come from below, but if a speaker is installed in a position near an ear, the sound spreads out naturally at an ear level, and this makes it possible to achieve acoustics as previously unimplemented. Additionally, there are advantages such as that occupants in the front seat and the rear seat may listen to music at respectively desired volume levels, and the like.

Examples as related art in the technology field include techniques as described in the following: the Japanese Unexamined Patent Application Publication No. 2019-108118, which discloses a speaker-equipped headrest capable of being manufactured by integral skin foam molding and having higher sealability, and a vehicle seat.

Also, the Japanese Unexamined Patent Application Publication No. 2003-299549 discloses the structure using a mechanism for mounting a headrest to a backrest to provide a connection of information transmission line of a monitor.

Also, Japanese Patent No. 4338028 discloses the structure for powering an electric component placed inside a headrest.

Also, Japanese Patent No. 4730255 discloses the coupling structure for wiring to a headrest in which, after connectors are coupled to each other by the operation of inserting a headrest stay, a held state of the connector that receives and holds on the seatback side is released.

Also, Japanese Patent No. 4976182 discloses the cable assembly enabling placement of a detachable member in a portion of the power transmission path.

Also, Japanese Patent No. 5343587 discloses the structure for simply assembling an operational cable to a cylinder case.

As described above, it is contemplated that the built-in headrest speakers are equipped on not only luxury vehicles but also compact vehicles and the like.

However, for the built-in headrest speaker, fitting a coupler and/or the like is required to be performed within a seat in order to couple the speaker to a vehicle body harness installed in a seat body. This makes it difficult to mount the built-in headrest speaker after the seat body is installed in the vehicle.

To address this, in a conventional manner, the harness is fitted during a seat assembly process performed before vehicle installation. Therefore, when installed in the vehicle, the seat with the headrest has a large package size. As a result, vehicle size classes on which such seats are installed are limited.

Further, harness connection is required in the mounting operation to the seat body. A larger number of person-hours are disadvantageously required.

None of the above-listed examples of the related art refers to the relation between the speaker-equipped headrests and the vehicle size classes, and provides any mention of problems as mentioned above and the means for solving thereof.

SUMMARY OF THE INVENTION

Accordingly, it is an object of the present invention to provide a vehicle seat with a speaker-equipped headrest, which is of a relatively simple structure to enable the speaker-equipped headrest to be easily mounted to/dismounted from a seat body after vehicle installation, and also provides increased versatility for installation in vehicles of various vehicle size classes.

To attain the object, an aspect of the present invention provides a vehicle seat with a speaker-equipped headrest including: a male coupler that is connected to a speaker harness and fitted to a distal end of a headrest stay; and a female coupler that is connected to a main harness on a seat body side, and fitted to a headrest guide bracket supporting a headrest guide. Insertion of the headrest stay into the headrest guide allows the speaker-equipped headrest to be mounted to the seat body, and allows the male coupler and the female coupler to be fitted together to provide a connection between the speaker harness and the main harness.

According to the present invention, it is possible to implement a vehicle seat with a speaker-equipped headrest which is of a relatively simple structure to enable the speaker-equipped headrest to be easily mounted to/dismounted from a seat body after vehicle installation, and also provides increased versatility for installation in vehicles of various vehicle size classes.

These and other objects, features and advantages will be apparent from a reading of the following description of example embodiments.

DETAILED DESCRIPTION OF THE PREFERRED EMBODIMENTS

Examples according to the present invention will now be described with reference to the accompanying drawings. It is to be noted that like reference signs indicate like configurations throughout the drawings, which are not duplicately described and the details may be omitted.

Example 1

A vehicle seat according to Example 1 of the present invention will be described with reference to FIG. 1 to FIG. 5B.

Figure 1:
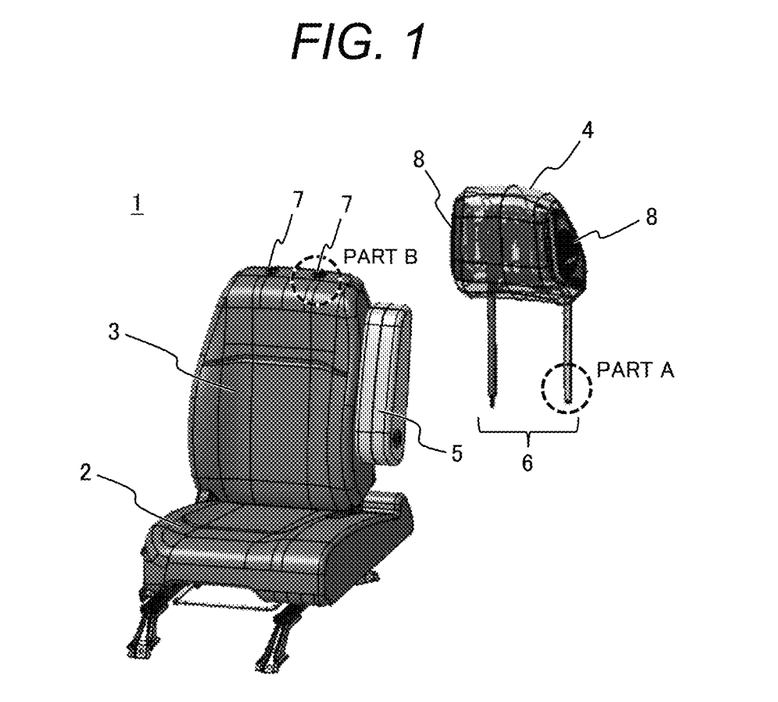
FIG. 1 shows a perspective view illustrating a principal part of a vehicle seat according to Example 1 of embodiments of the present invention.

FIG. 1 shows a perspective view illustrating a principal part of the vehicle seat according to Example 1. As illustrated in FIG. 1, the vehicle seat 1 in the example includes a seat cushion 2 on which an occupant sits, and a seatback 3 which is placed on the back side of the seat cushion 2 to provide a back support for the occupant. An armrest 5 is placed on the side of the seatback 3 in a forward and rearward rotatable manner to provide an armrest for the occupant.

In an upper portion of the seatback 3, two headrest stay insertion holes 7 are placed. Headrest stays 6 of a headrest 4 are inserted respectively into the headrest stay insertion holes 7, so that the headrest 4 is mounted on the upper portion of the seatback 3. The headrest 4 protects a head and a neck region of the occupant.

Speakers 8 are incorporated respectively into both lateral sides of the headrest 4. It is noted that the speaker/speakers 8 may be incorporated into a backside (on the rear seat side) of the headrest 4 for an occupant/occupants sitting in the rear seat, or alternatively the speakers 8 may be located in the backside and the both lateral sides of the headrest 4.

Figure 2:
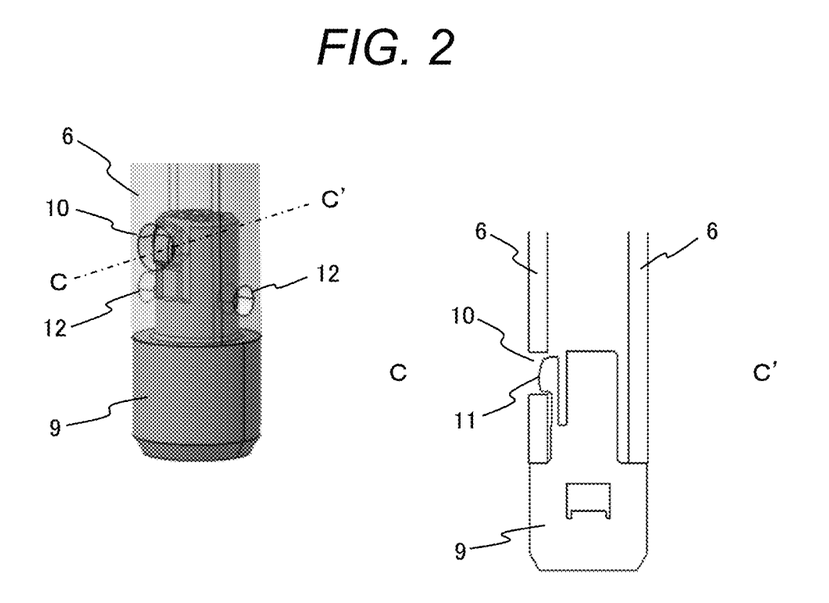
FIG. 2 shows a diagram illustrating a detailed structure of part A of FIG. 1.
Figure 3A:
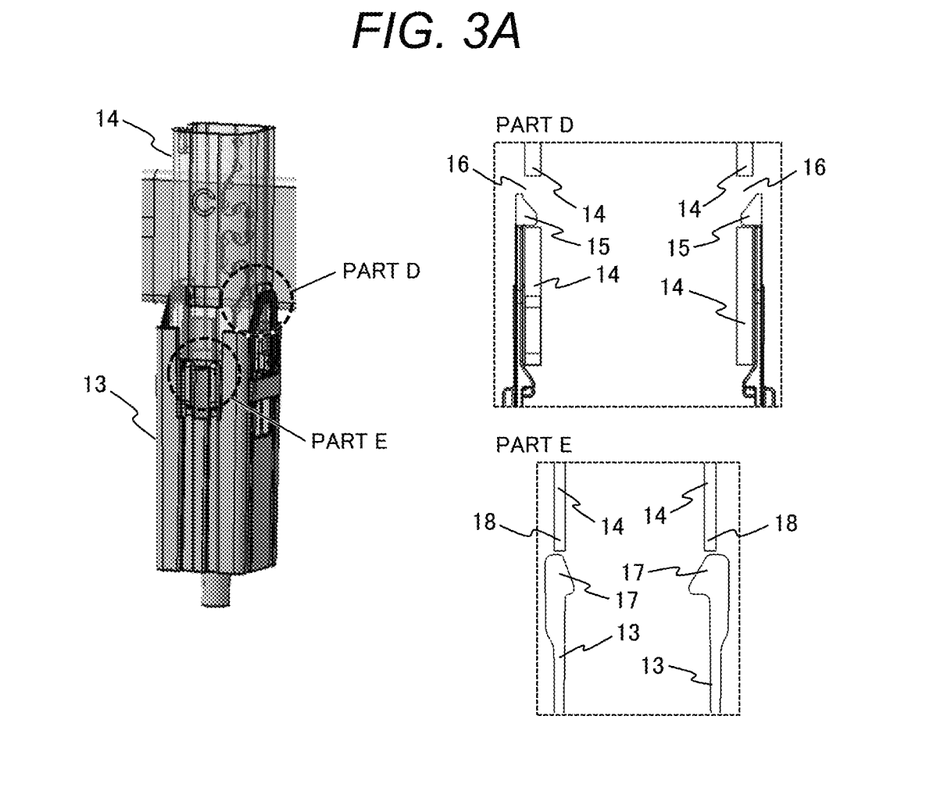
FIG. 3A shows a diagram illustrating an internal structure of part B of FIG. 1.
Figure 3B:
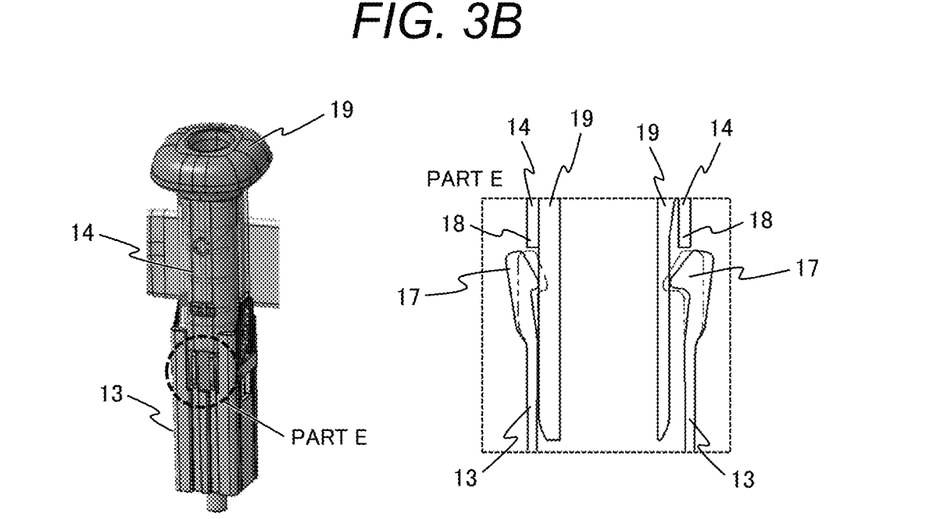
FIG. 3B shows a diagram illustrating the state where a headrest guide 19 is mounted to FIG. 3A.

Reference is made to FIG. 2 to FIG. 3B to illustrate the structure of a distal end of each of the headrest stays 6 (part A of FIG. 1) and the structure of the interior of each of the headrest stay insertion holes 7 (part B of FIG. 1).

As illustrated in FIG. 2, the distal end of the headrest stay 6 is configured such that a plastic male coupler 9 is fitted to the distal end of the metallic (typically, of iron), hollow headrest stay 6. An engagement claw 11 of the male coupler 9 is engaged in an engagement hole 10 of the headrest stay 6, whereby the male coupler 9 is secured (locked) to the distal end of the headrest stay 6.

It is noted that, although not shown, the male coupler 9 is connected to the speaker 8 (speaker harness) incorporated in the headrest 4, through wiring installed within the hollow headrest stay 6.

Also, a plurality of engagement holes 12 are placed in proximity to the distal end of the headrest stay 6 for engagement with a female coupler 13 which will be described later.

As illustrated in FIG. 3A, the interior of the headrest stay insertion hole 7 (part B of FIG. 1) is configured such that the plastic female coupler 13 is fitted to a lower portion of a metallic (typically, of iron), hollow headrest guide bracket 14.

As illustrated in an enlarged view of part D, engagement claws 15 of the female coupler 13 are engaged in engagement holes 16 of the headrest guide bracket 14, whereby the female coupler 13 is secured (locked) to the lower portion of the headrest guide bracket 14.

Also, as illustrated in an enlarged view of part E, a stopper 17 of the female coupler 13 and a stopper 18 of the headrest guide bracket 14 are latched together, so that the female coupler 13 is prevented from being excessively inserted into the headrest guide bracket 14.

FIG. 3B illustrates the state where a plastic headrest guide 19 is mounted to FIG. 3A. The headrest guide 19 is inserted into an upper portion of the headrest guide bracket 14 from above. Thus, as illustrated in an enlarged view of part E, the stopper 17 of the female coupler 13 is pushed outward to be unlatched (unlocked) from the stopper 18 of the headrest guide bracket 14. Thereby, if the height of the headrest 4 is desired to be adjusted to a lower level, the headrest guide 19 is pressed so that the headrest 4 can be pushed downward.

After the headrest guide 19 is inserted into the headrest guide bracket 14, the headrest guide 19 is supported by the headrest guide bracket 14.

Figure 4:
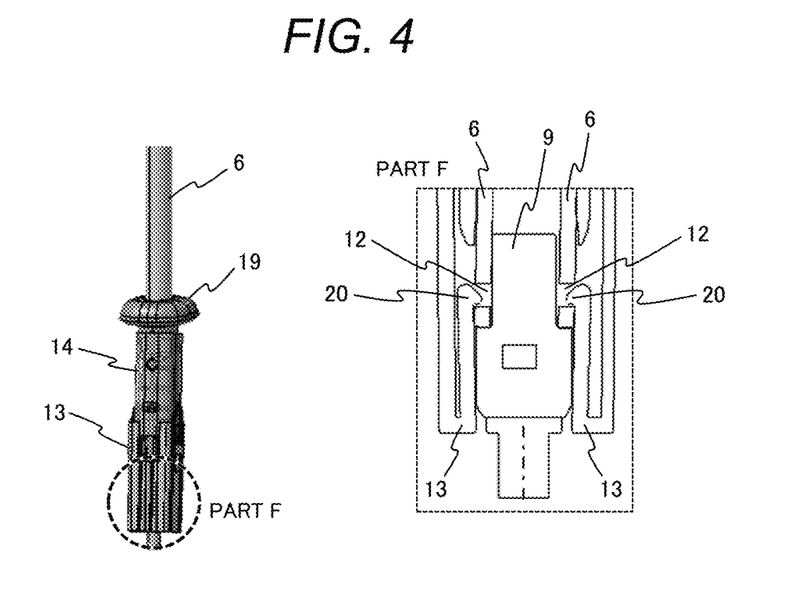
FIG. 4 shows a diagram illustrating the state where a headrest stay 6 is inserted in FIG. 3B.

The mounting structure for the headrest 4 is described using FIG. 4 that illustrates the state where the headrest stay 6 is inserted in FIG. 3B.

The insertion of the headrest stay 6 into the headrest stay insertion hole 7 (see FIG. 1) enables insertion of the headrest stay 6 into the hollow headrest guide 19 as illustrated in FIG. 4. After the headrest stay 6 is inserted into the headrest guide 19, the headrest stay 6 is supported by the headrest guide bracket 14 and the headrest guide 19.

In this stage, as illustrated in an enlarged view of part F, the male coupler 9 and the female coupler 13 are fitted together. Then, the engagement claws 20 of the female coupler 13 are engaged respectively in the engagement holes 12 of the headrest stay 6, so that the coupling between the headrest stay 6 and the female coupler 13 is secured (locked), and also the fit between the male coupler 9 and the female coupler 13 is secured (locked).

Figure 5A:
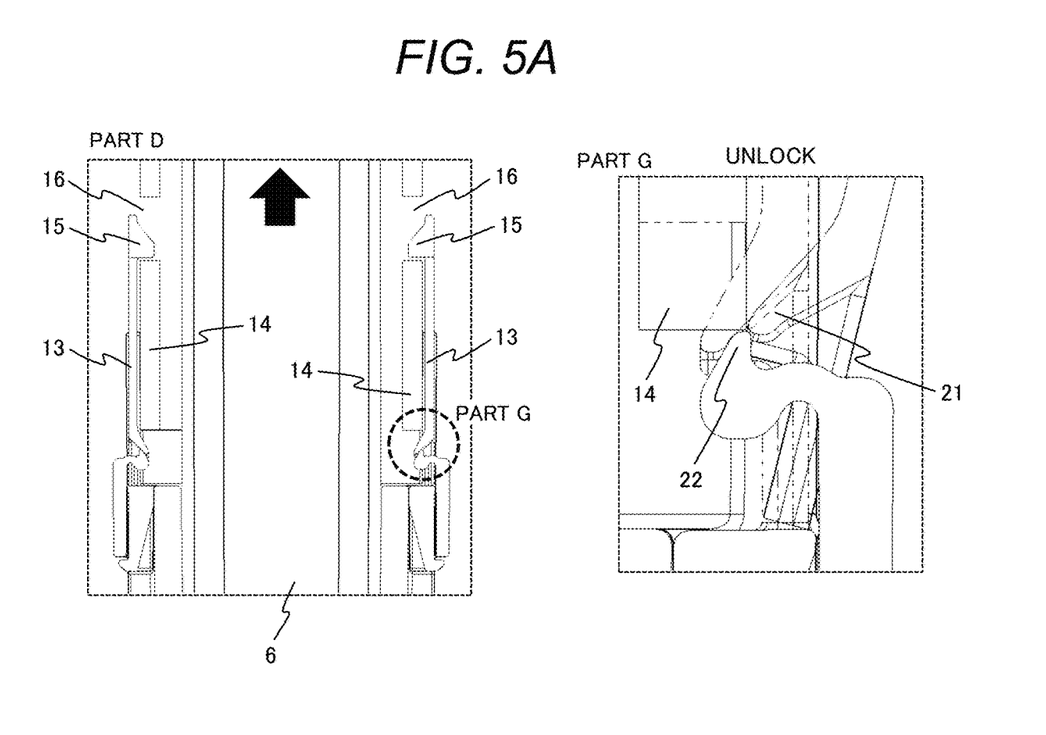
FIG. 5A shows a diagram illustrating a detailed structure of part D of FIG. 3A.
Figure 5B:
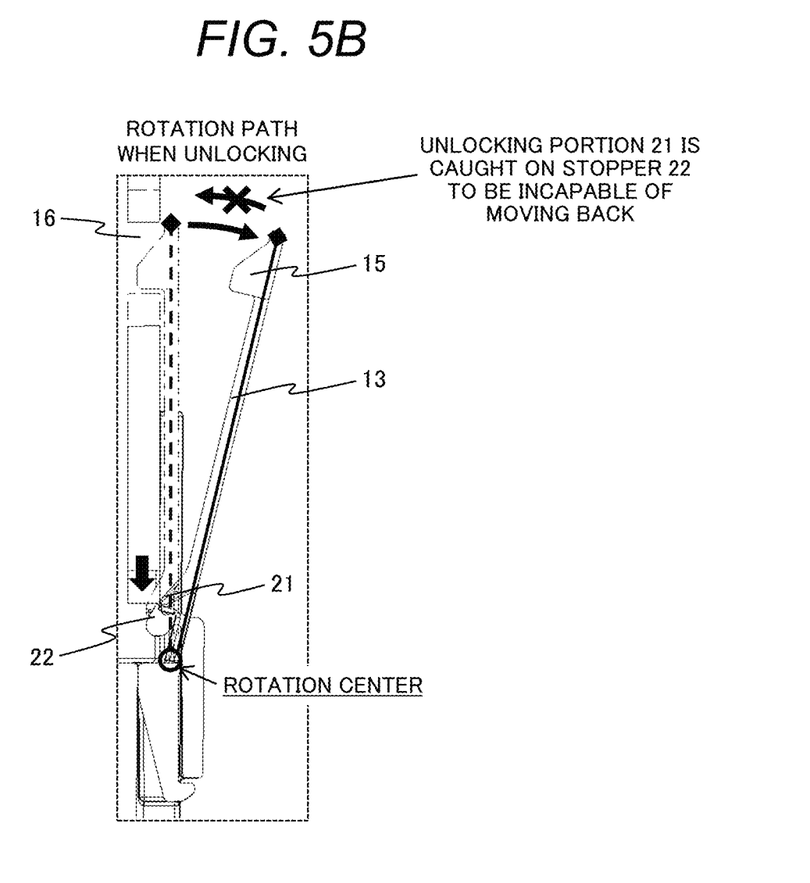
FIG. 5B shows a diagram illustrating the operation of a locking mechanism in FIG. 5A.

The falling off structure for the female coupler 13 is described using FIG. 5A and FIG. 5B. FIG. 5A illustrates the structure of part D of FIG. 3A when the headrest stay 6 is inserted into the headrest insertion hole 7 (FIG. 1).

As illustrated in FIG. 5A, pulling the headrest stay 6 upward (the direction of arrow) causes interference between the headrest guide bracket 14 and an unlocking portion 21 of the female coupler 13 as illustrated in an enlarge view of part G. Then, the unlocking portion 21 is pushed by the headrest guide bracket 14, so that each engagement claw 15 of the female coupler 13 moves along a rotation path, as shown in FIG. 5B, to release the lock.

The unlocking portion 21 climbs over a stopper 22, so that the unlocking portion 21 is caught on the stopper 22 to be incapable of moving back. This enables maintenance of unlock without the unlocking portion 21 returning to the initial state. Then, the headrest stay 6 is reinserted downward, making it possible to move the headrest 4 to the lowest level of height.

As described above, the vehicle seat according to the example is configured to include: the male couplers 9 each of which is connected to the speaker 8 (speaker harness) and also fitted to the distal end of the headrest stay 6; and the female couplers 13 each of which is connected to the main harness on the seat body side and also fitted to the headrest guide bracket 14 supporting the headrest guide 19, in which, by inserting the headrest stays 6 into the headrest guides 19, the headrest 4 is mounted to the seat body, and also the male coupler 9 and female coupler 13 are fitted together to provide a connection between the speaker 8 (speaker harness) and the main harness.

Also, the headrest guide bracket 14 has the engagement hole 16 placed in proximity to the end fitted to the female coupler 13, while the female coupler 13 has the engagement claw 15 at the end fitted to the headrest guide bracket 14, so that the female coupler 13 is fitted to the headrest guide bracket 14 by engaging the engagement claw 15 with the engagement hole 16.

The female coupler 13 includes an unlocking mechanism to rotate the engagement claw 15 outward in the radial direction of the female coupler 13 in step with the movement of pulling the headrest stay 6 out of the headrest guide 19, and, by pulling the headrest stay 6 upward, the fit between the female coupler 13 and the headrest guide bracket 14 is released.

The female coupler 13 includes an unlock maintaining mechanism in which the unlocking portion 21 climbs over the stopper 22 to maintain the disengagement between the engagement claw 15 and the engagement hole 16 provided by the unlocking mechanism. The headrest stay 6 can be reinserted into the headrest guide 19 in order to allow to be inserted to the lowest position.

Also, the headrest stay 6 has a plurality of engagement holes 12 placed in proximity to the distal end fitted to the male coupler 9, and the female coupler 13 has engagement claws 20 placed in proximity of the end fitted to the male coupler 9, so that engagement between the engagement claws 20 and the engagement holes 12 provides a locked fit between the male coupler 9 and the female coupler 13.

According to the example, after the seat body has been mounted on the vehicle, the speaker-equipped headrest may be attached. Thus, the seat body and the headrest may be packaged separately from each other. Further, the reduced physical size of package leads to a wider range of allowable vehicle size classes for vehicle installation. In addition, the reduced physical size of package may enable a reduction in the cost of transporting the seats.

Also, in the seat assembly process, a connection job for the speaker harness and the main harness can be removed.

Example 2

A vehicle seat according to Example 2 of the present invention will now be described with reference to FIG. 6 to FIG. 8B.

Figure 6:
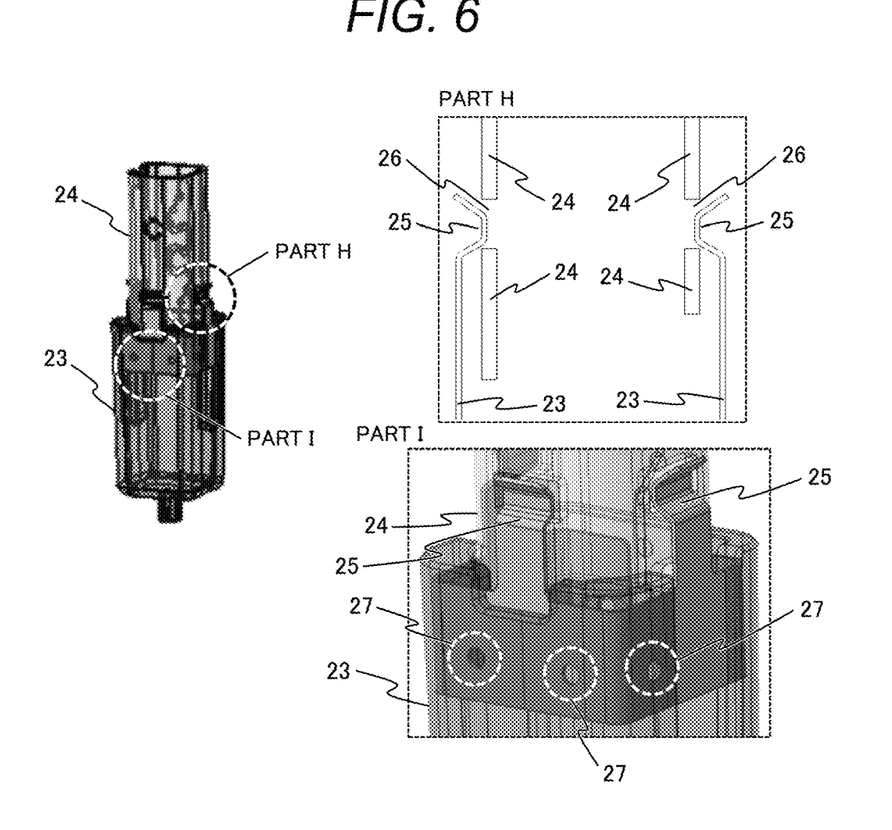
FIG. 6 shows a diagram illustrating a detailed structure of a vehicle seat according to Example 2 of embodiments of the present invention.

FIG. 6 shows diagrams illustrating the internal structure of part B of FIG. 1, and corresponds to a modification example of Example 1 (FIG. 3A). As illustrated in FIG. 6, instead of the engagement claws 15 and the engagement holes 16 in Example 1 (FIG. 3A), the vehicle seat 1 according to Example 2 includes: metallic leaf springs 25 respectively molded integrally with female coupler mounts 23; and engagement holes 26 of a headrest guide bracket 24. Each of the metallic leaf springs 25 has a protruding portion protruding inward in the radial direction of the female coupler mount 23.

The protruding portion of each metallic leaf spring 25 of the female coupler mount 23 is engaged in the corresponding engagement hole 26 of the headrest guide bracket 24, whereby the female coupler mount 23 is secured (locked) to a lower portion of the headrest guide bracket 24.

It is noted that, for the female coupler according to the example, the metallic leaf springs 25 are insert-molded in the injection molding process for the plastic female coupler mount 23 so that the female coupler mount 23 and the metallic leaf springs 25 are molded in an integral structure. Openings are formed in a base portion for the metallic leaf springs 25, and resin is poured in the insert-molding process to form wedges 27.

Figure 7:
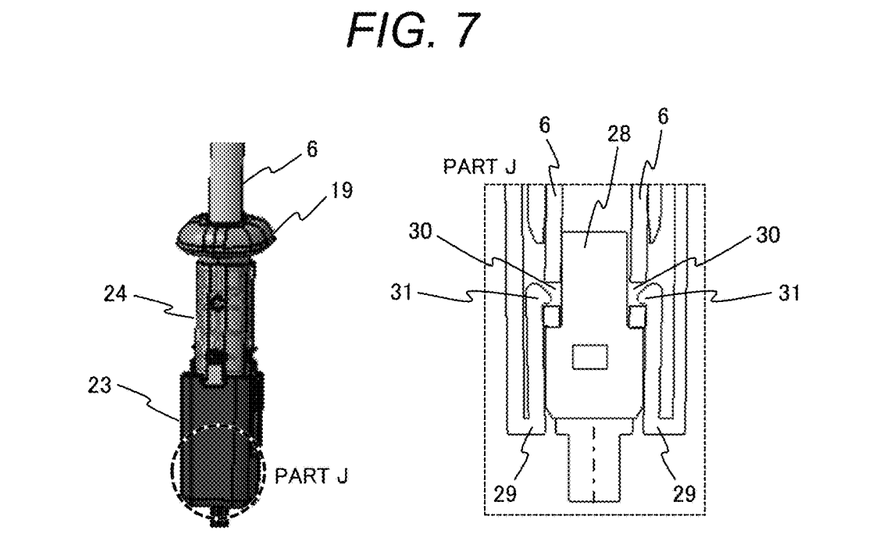
FIG. 7 shows a diagram illustrating the state where a headrest stay 6 is inserted in FIG. 6.

Reference is made to FIG. 7 to describe the mounting structure for the headrest 4. FIG. 7 shows diagrams corresponding to FIG. 4 in Example 1 and the basic structure is similar to that in FIG. 4.

By inserting each headrest stay 6 into the headrest stay insertion hole 7 (FIG. 1), as illustrated in FIG. 7, the headrest stay 6 is inserted into the hollow headrest guide 19. After the headrest stay 6 is inserted into the headrest guide 19, the headrest stay 6 is supported by the headrest guide bracket 24 and the headrest guide 19.

And, in this stage, as illustrated in an enlarged view of part J, a male coupler 28 and the female coupler 29 are fitted together. The engagement claw 31 of the female coupler 29 is engaged in the engagement hole 30 of the headrest stay 6, whereby the coupling between the headrest stay 6 and the female coupler 29 is secured (locked) and the fit between the male coupler 28 and the female coupler 29 is also secured (locked).

Figure 8A:
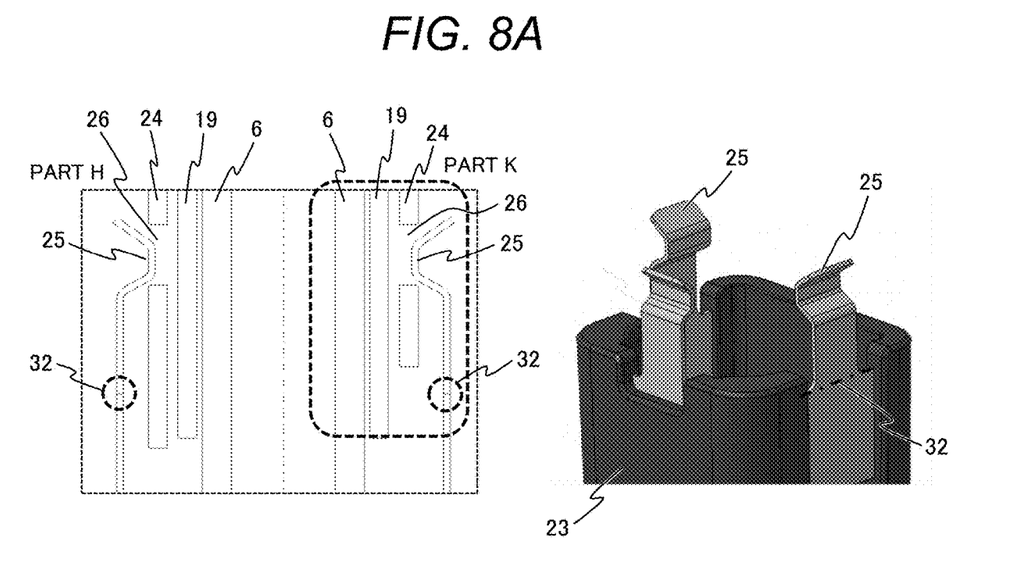
FIG. 8A shows a diagram illustrating a detailed structure of part H of FIG. 6.
Figure 8B:
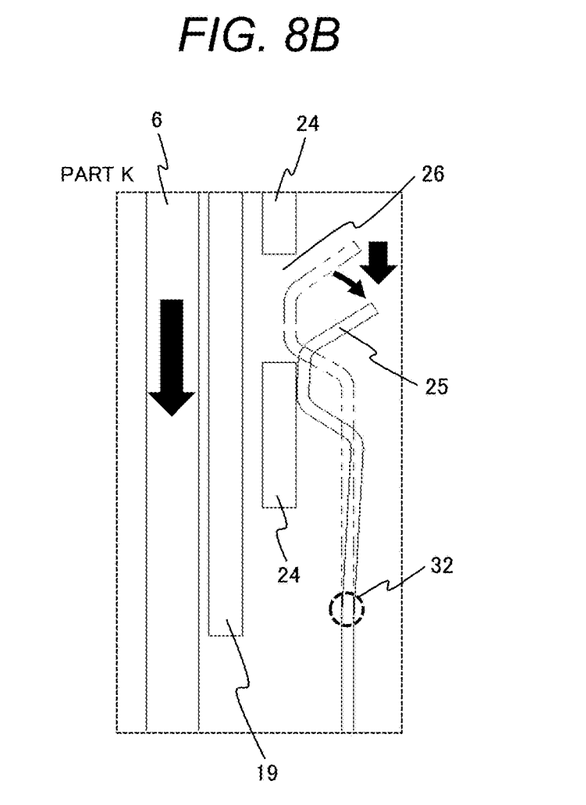
FIG. 8B shows a diagram illustrating the operation of a locking mechanism in FIG. 8A.

The falling off structure for the female coupler 29 is described using FIG. 8A and FIG. 8B. The left view of FIG. 8A illustrates the structure of part H of FIG. 6 when the headrest stay 6 is inserted into the headrest insertion hole 7 (FIG. 1).

As illustrated in FIG. 8A, the headrest stay 6 is inserted into the headrest stay insertion hole 7 (FIG. 1) to fit the male coupler 28 and the female coupler 29 together. After that, as illustrated in FIG. 8B, the headrest stay 6 is pressed further downward, so that the engagement between the protruding portion of the metallic leaf spring 25 and the engagement hole 26 is released.

As described above, the vehicle seat according to the example is configured such that the headrest guide bracket 24 has the engagement holes 26 placed in proximity of the end fitted to the female coupler (the female coupler mount 23); the female coupler (the female coupler mount 23) has the metallic leaf springs 25 at the end fitted to the headrest guide bracket 24; and the protruding portions of the metallic leaf springs 25 are engaged in the engagement holes 26 to cause the female coupler (female coupler mount 23) to be fitted to the headrest guide bracket 24.

Also, for the female coupler, the metallic leaf springs 25 are insert-molded in the injection molding process for the plastic female coupler mount 23 so that the female coupler mount 23 and the metallic leaf springs 25 are molded in an integral structure.

Also, after the male coupler 28 and the female coupler 29 are fitted together, the headrest stay 6 is pushed further downward so that the engagement between the protruding portions of the metallic leaf springs 25 and the engagement holes 26 is released to disconnect the fit between the female coupler 29 and the headrest guide bracket 24.

According to the example, the metallic leaf springs 25 and the female coupler are integral with each other. This brings about, in addition to the advantages described in Example 1, the advantage that the harness connection job in the seat assembly process can be removed without an increase in component count in the assembly process.

The present invention is not limited to the above examples, and intended to embrace various modifications. For example, the above examples have been described in detail to provide a simple understanding of the present invention, and the present invention is not necessarily limited to including all the components and configurations described above. Further, a portion of the configuration in one example may be replaced with configuration in another example and/or a configuration in one example may be added to a configuration in another example. Further, on a portion of the configuration in each example, addition, deletion and replacement of another configuration may be made.

REFERENCE SIGNS LIST

1 . . . vehicle seat
2 . . . seat cushion
3 . . . seatback
4 . . . headrest
5 . . . armrest
6 . . . headrest stay
7 . . . headrest stay insertion hole
8 . . . speaker
9 . . . male coupler
10 . . . engagement hole
11 . . . engagement claw (of male coupler)
12 . . . engagement hole
13 . . . female coupler
14 . . . headrest guide bracket
15 . . . engagement claw (of female coupler)
16 . . . engagement hole
17 . . . stopper (of female coupler)
18 . . . stopper (of headrest guide bracket)
19 . . . headrest guide
20 . . . engagement claw
21 . . . unlocking portion (of female coupler)
22 . . . stopper
23 . . . female coupler mount
24 . . . headrest guide bracket
25 . . . metallic leaf spring
26 . . . engagement hole
27 . . . wedge
28 . . . male coupler
29 . . . female coupler
30 . . . engagement hole
31 . . . engagement claw
32 . . . rotation center

What is claimed is:

1. A vehicle seat with a speaker-equipped headrest, comprising:
a male coupler that is connected to a speaker harness and fitted to a distal end of a headrest stay; and
a female coupler that is connected to a main harness on a seat body side, and fitted to a headrest guide bracket supporting a headrest guide,
wherein insertion of the headrest stay into the headrest guide allows the speaker-equipped headrest to be mounted to the seat body, and allows the male coupler and the female coupler to be fitted together to provide a connection between the speaker harness and the main harness,
wherein the headrest guide bracket has an engagement hole placed in proximity of an end thereof fitted to the female coupler,
the female coupler has an engagement claw placed at an end thereof fitted to the headrest guide bracket, and
engagement of the engagement claw in the engagement hole allows the female coupler to be fitted to the headrest guide bracket,
wherein the female couple includes an unlocking mechanism to rotate the engagement claw outward in a radial direction of the female coupler in step with movement of pulling the headrest stay out of the headrest guide, and
by pulling the headrest stay upward, fit between the female coupler and the headrest guide bracket is released,
wherein the female coupler includes an unlock maintaining mechanism to cause an unlocking portion to climb over a stopper to maintain disengagement between the engagement claw and the engagement hole provided by the unlocking mechanism, and
by reinserting the headrest stay into the headrest guide, the headrest stay can be inserted to a lowest position.

2. A vehicle seat with a speaker-equipped headrest, comprising:
a male coupler that is connected to a speaker harness and fitted to a distal end of a headrest stay; and
a female coupler that is connect to a main harness on a seat body side, and fitted to headrest guide bracket supporting a headrest guide,
wherein insertion of the headrest stay into the headrest guide allows the speaker-equipped headrest to be mounted to the seat body, and allows the male coupler and the female coupler to be fitted together to provide a connection between the speaker harness and the main harness,
wherein the headrest guide bracket has an engagement hole placed in proximity of an end thereof fitted to the female coupler,
the female coupler has a metallic leaf spring placed at an end thereof fitted to the headrest guide bracket, and
the metallic leaf spring has a protruding portion engaged in the engagement hole to cause the female coupler to be fitted to the headrest guide bracket.

3. The vehicle seat according to claim 2,
wherein the female coupler is molded into an integral structure of a female coupler mount and the metallic leaf spring by insert-molding the metallic leaf spring during an injection molding process for the female coupler mount made of plastic.

4. The vehicle seat according to claim 2,
wherein after the male coupler and the female coupler are fitted together, the headrest stay is pushed further downward in order to release engagement between the protruding portion of the metallic leaf spring and the engagement hole to disconnect fit between the female coupler and the headrest guide bracket.

5. The vehicle seat according to claim 2,
wherein the headrest stay has an engagement hole placed in proximity to a distal end thereof fitted to the male coupler,
the female coupler has an engagement claw placed in proximity to an end thereof fitted to the male coupler, and
the engagement hole and the engagement claw are engaged with each other to lock the fit between the male coupler and the female coupler.

6. The vehicle seat according claim 1,
wherein the headrest stay has an engagement hole placed in proximity to a distal end thereof fitted to the male coupler,
the female coupler has an engagement claw placed in proximity to an end thereof fitted to the male coupler, and
the engagement hole and the engagement claw are engaged with each other to lock the fit between the male coupler and the female coupler.

* * * * *